P. H. FABRICIUS.
COMBINED DRAWING AND MEASURING INSTRUMENT.
APPLICATION FILED SEPT. 23, 1915.
1,202,041.
Patented Oct. 24, 1916.
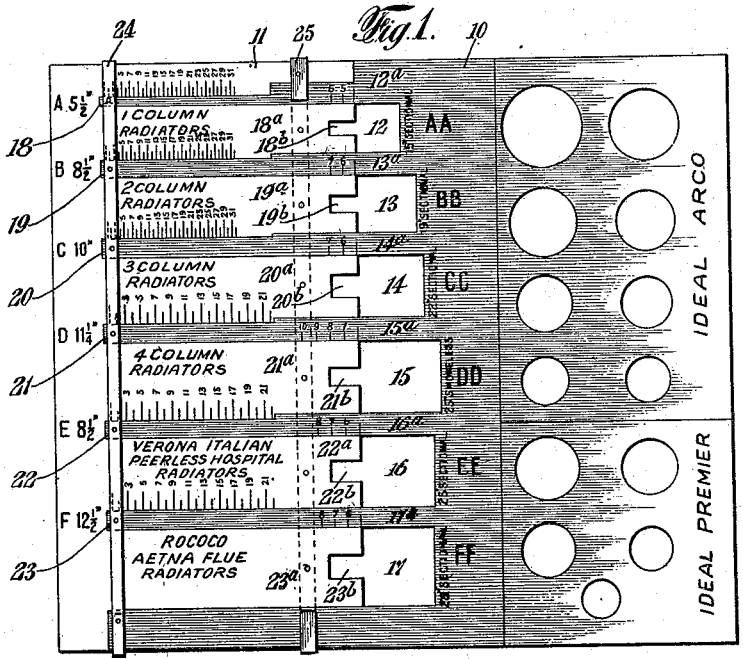
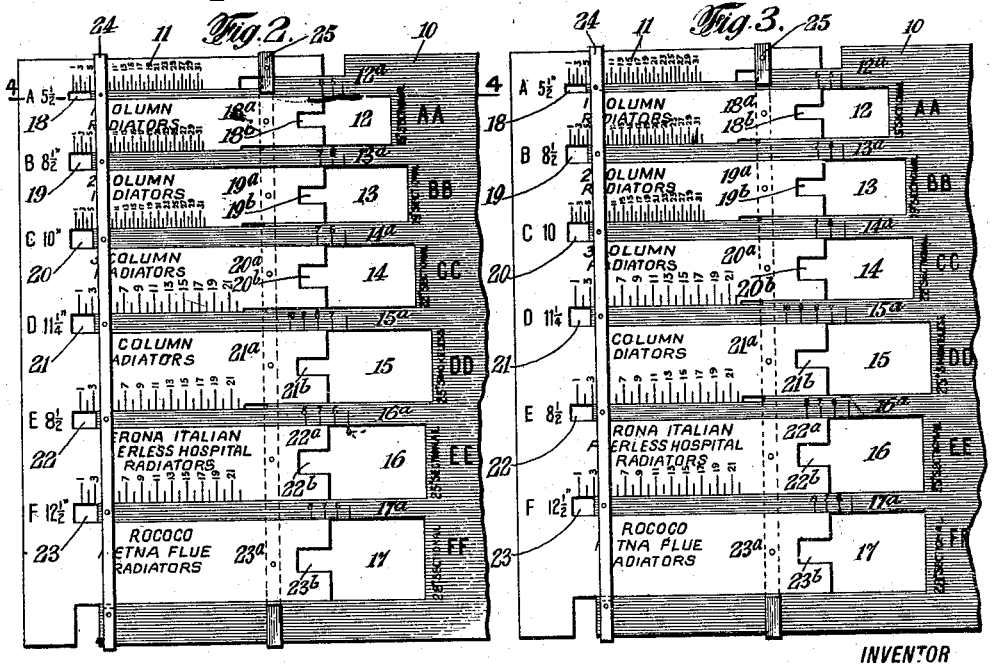
INVENTOR
PAUL H. FABRICIUS
BY
Conrad A. Dieterich
his ATTORNEY

UNITED STATES PATENT OFFICE.

PAUL H. FABRICIUS, OF NEW YORK, N. Y.

COMBINED DRAWING AND MEASURING INSTRUMENT.

1,202,041.          Specification of Letters Patent.      Patented Oct. 24, 1916.

Application filed September 23, 1915. Serial No. 52,186.

*To all whom it may concern:*

Be it known that I, PAUL H. FABRICIUS, a citizen of the United States, residing at the city of New York, borough of Manhattan, in the county and State of New York, have invented certain new and useful Improvements in Combined Drawing and Measuring Instruments, of which the following is a full, clear, and exact specification.

My invention relates to improvements in drawing instruments, and the same has for its object more particularly to provide a simple, efficient and accurate apparatus by means of which the contour or outline of an object, which is capable of being varied or enlarged within predetermined limits, may be readily and definitely ascertained for the several sizes in which said object is designed to be manufactured, or produced.

Further, said invention has for its object to provide an apparatus of the character specified in which the horizontal outline or contour of an object, capable of being varied or enlarged within certain or fixed limits, may be readily and accurately determined upon any predetermined scale.

Further, said invention has for its object to provide an apparatus of the character specified comprising a pair of coöperating sections having recesses in their opposing edges indicating a specified object or a series of objects, and dividing members between the recesses of each of said members slidably fitted within the recesses of the coöperating member.

Further, said invention has for its object to provide an apparatus of the character specified comprising a pair of coöperating members each having a series of suitably graduated recesses in its edge, and spacing members separating said recesses, and the recesses of each of said members adapted to receive the free ends of the spacing members of the other of said members; the inner ends of said recesses, and the ends of the spacing members working therein, serving to indicate graphically and to a predetermined scale, the relative sizes and approximate contours of the objects intended to be represented thereby.

Other objects will in part be obvious, and in part be pointed out hereinafter.

To the attainment of the aforesaid objects and ends, my invention consists in the novel details of construction, and in the combination, connection and arrangement of parts hereinafter more fully described and then pointed out in the claims.

In the accompanying drawings forming part of this specification wherein like numerals of reference indicate like parts, Figure 1 is a face view showing one form of a combined drawing and measuring instrument constructed according to, and embodying my said invention, and adapted for determining the sizes of boilers and radiators of certain types; Fig. 2 is a detail face view showing the instrument adjusted to determine the sizes of boilers; Fig. 3 is a similar view showing the instrument adjusted to determine the size of the radiators, and Fig. 4 is a transverse section taken on the line 4—4 of Fig. 2.

In said drawings I have shown my invention embodied in an instrument designed for use by heating engineers, architects, etc., and whereby to enable them to ascertain readily and accurately the size of a given type boilers and radiators to be used in a planned construction, and to provide a templet or gage by means of which the determined size of the boilers and radiators may be plotted directly upon the plans of a building, and when the desired position has been located, to enable the engineer or architect to outline the same directly upon the drawing.

In carrying out my said invention I provide an instrument consisting of two coöperating, registering sections 10, 11, which are made in the form of flat plates, and preferably of transparent material, such as celluloid, horn, or similar material. The section 10 is provided at its left hand edge with a suitable series of longitudinal recesses 12, 13, 14, 15, 16, 17, which are rectangular in form, and arranged in parallelism which become gradually wider in predetermined progression in the direction at right angles to the longitudinal axis of said recesses, and are separated from each other by relatively narrow spacing members $12^a$, $13^a$, $14^a$, $15^a$, $16^a$, $17^a$. The section 11 is also formed with a series of recesses 18, 19, 20, 21, 22, 23, which are rectangular in form and arranged in parallelism, and separated from each other by relatively wide spacing members, $18^a$, $19^a$, $20^a$, $21^a$, $22^a$, $23^a$. The recesses 18, 19, 20, 21, 22, 23, in the section 11, are adapted to receive the spacing members $12^a$, $13^a$, $14^a$, $15^a$, $16^a$, $17^a$, of the section 10, and the spacing members, 18$^a$, 19$^a$, 20$^a$, 21$^a$, 22$^a$, 23$^a$, of the section 11, are adapted to be received by the recesses 12, 13, 14, 15, 16, 17, of the section 10.

The spacing members 18$^a$, 19$^a$, 20$^a$, 21$^a$, 22$^a$, 23$^a$ are respectively provided at their free ends with small recesses 18$^b$, 19$^b$, 20$^b$, 21$^b$, 22$^b$, 23$^b$, which together with the inner ends of the recesses 12, 13, 14, 15, 16, 17 of the section 10 serve to represent the contour or horizontal outline of a certain or selected type of boiler, and the inner ends of the recesses 18, 19, 20, 21, 22, 23, together with the transverse edge of the free ends of the spacing members 12$^a$, 13$^a$, 14$^a$, 15$^a$, 16$^a$, 17$^a$, serve to represent the contour or horizontal outline of a selected make of radiators, of several different styles, and sizes.

The recesses indicating the boilers are shown as of six different styles or design, and for each style or design is provided a scale indicating the minimum size of each boiler and the several larger sizes to which said particular style or design is capable of being increased or extended up to the maximum. For example, the smallest size of one type is represented by the recess 12 of the scale AA, when the sections 10, 11 are retracted fully. In said position the recess 12 represents a sectional boiler of four sections which may be extended longitudinally to five or six sections; of which the latter number designates the maximum number of sections to which said boiler may be enlarged. Should a boiler of the same general type or design, but of larger capacity, be required it would become necessary to utilize the next larger scale viz., "BB" which represents a similar, but wider, size boiler whose minimum length comprises five sections, and which is capable of being increased or extended to a maximum of seven sections. Should a still larger boiler be required the next scale "CC" would be employed which represents a boiler of the same style or design, but of still larger capacity, than the ones represented by scales "AA" and "BB". Upon said scale "CC" the boiler is represented as comprising a minimum of five sections which may be increased up to seven sections. Upon the other section 11, are indicated scales for radiators of different styles or designs, beginning with A representing the smallest size, i. e. the narrowest or one-column radiator of a given make which may be increased to any desired length. The scale, as a matter of convenience, however, is only graduated to indicate thirty-two sections since, if a greater amount of radiating surface were required, a two, three or four column section would be employed, and a lesser number assembled to form the radiator.

The recess 19 of the scale B is designed to represent a radiator of greater capacity, for example, a two column radiator, and the scale corresponding thereto is graduated to indicate the same number of sections, as the scale A namely, thirty-two. The next succeeding scale C, represented by the recess 20, is intended to represent a three column radiator, and is also graduated to represent the same number of sections. The succeeding scales are designed to represent radiators of five and six columns, and also radiators of different types, such as wall or other forms of radiators. It will be noted, however, that in connection with the scales representing the radiators that the same increase successively in width. The width being standard for each style or size, and that the increase in the size of the radiator is merely in the direction of its length, that is to say, in the radiators represented by the scales A, B, and C the distance between centers of adjoining sections is uniformly two and one-half inches, while in scale D the distance between centers is three inches. In the said instrument as shown the recesses indicating the boilers, and the recesses indicating the radiators are both represented on a scale of one-quarter of an inch to a foot. The scale, however, is immaterial, and the boilers and radiators may be represented by any other desired scale.

At the right hand side of the section 10 are shown a certain number of circular apertures which are designed to represent a selected type of circular boilers of different capacities on the same scale as those indicated by AA, BB, CC, etc. Obviously as the outlines of said circular boilers, as represented cannot be increased or diminished in size upon the instrument the different sizes must be separately indicated for each given make or style.

In order to hold the sections 10 and 11 duly connected with each other and in operative relation, and to prevent injury to the spacing members of each section, the free ends of the spacing members of the section 10 are secured to a longitudinal strip or member 24 which has its opposite ends bent rearwardly, and below the upper and lower edges of the section 11 so as to be slidable thereon, and the section 11 is provided upon its underside with a similar strip 25 to which the free ends of the spacing members 18$^a$, 19$^a$, etc., are secured. The said member 25 has its ends bent upwardly and over upon the upper surface of said section 10, to embrace the upper and lower edges thereof. The outward movement of the sections 10 and 11 relative to each other is thus limited by the engagement of the opposing edges of the members 24, 25 when said parts 10 and 11 are fully extended. In addition to holding the parts 10 and 11 duly together the said members 24, 25 serve to hold the spacing members 12$^a$, 13$^a$, etc., and 18ª, 19ª, etc., duly positioned so that the same will work properly within their respective recesses.

The operation of the apparatus is as follows: In order to enable an architect or engineer to plot upon the floor plans of a building the size of the radiator it merely becomes necessary for him to determine the number of square feet of radiation that the boiler must supply, and when this has been determined select the type of boiler which is capable of supplying that amount of radiating surface. Hereupon it merely becomes necessary to adjust the scale to correspond to the desired size and the boiler then plotted upon the plan, and outlined thereon by tracing, with a pencil the interior edge of the recess, representing in plan or horizontal outline the desired boiler. As the scale for both the boiler and the radiators is the same, the architect or engineer is further enabled readily and accurately to determine the size of the several radiators required for the rooms, and also the floor space each will occupy. By placing the scale in position upon the floor plan, the place where the radiator will fit most advantageously and will harmonize best with the architectural features of the room may be easily and accurately plotted, and indicated upon the plan.

As a matter of convenience I prefer to make the scale parts 10 and 11 of transparent material in order that the same will permit of the viewing of the drawing therethrough when the scale is placed in position upon a plan while locating the boiler and radiators thereon.

It will, of course, be understood that while I have shown my invention applied to an instrument graduated to a scale of one-quarter inch to a foot, and have described the same for use in determining the size of boilers and radiators that the said instrument can be utilized or employed to the size of other objects whose dimensions may vary in one direction, and that such objects may be indicated upon any desired scale.

Having thus described my said invention, what I claim and desire to secure by Letters Patent is:—

1. An apparatus of the character described comprising a pair of interengaging sections, one of said sections having a recess therein shaped to correspond to the outline of a predetermined object, and the other of said sections having a projecting member thereon adapted to work within said recess in said first-named section whereby to vary the dimension, in one direction, of the object represented by said recess as said second-named section is adjusted relative to said first-named section, whereby the several outlines of the object represented may be plotted substantially as specified.

2. An apparatus of the character described comprising a pair of interengaging sections, one of said sections having a series of recesses therein whose inner ends serve to represent predetermined objects of varying outlines, and projections on the other of said sections adapted to work within the recesses of the first-mentioned section whereby to vary the dimension of said recesses in one direction to indicate different sizes of said objects, substantially as specified.

3. An apparatus of the character described comprising a pair of interengaging sections, each having a series of recesses whose inner ends designate a particular object or series of objects of varying outlines, and spacing members serving to separate said recesses; the spacing members of each of said sections being adapted to work within the recesses of the other of said sections, and by the movement of said sections relative to each other being adapted to vary the sizes of said recesses in one direction to indicate several different dimensions of the objects represented by said recesses, substantially as specified.

4. An apparatus of the character described comprising a pair of interengaging sections each having recesses of varying outlines therein forming part of a scale, and spacing members separating the recesses from one another, the spacing members of each section serving as adjustable scale parts for the scale parts formed by the recesses in the other section, substantially as specified.

5. An apparatus of the character described comprising a pair of interengaging sections, one of said sections having a recess therein and indicating marks therefor to form one part of a scale for indicating the outlines of several sizes of a predetermined object, and the other of said sections having a recess therein and indicating marks therefor to form one part of a scale for indicating the outlines of several sizes of a different predetermined object, each section being provided with a member forming an adjustable scale part for the scale part formed by the recess of the other section, substantially as specified.

6. An apparatus of the character described comprising a pair of interengaging sections, one of said sections having recesses of varying outlines therein and indicating marks therefor to form one part of a scale for indicating a series of objects, and the other of said sections having a series of recesses of varying outlines therein and indicating marks therefor to form one part of a scale for indicating another series of objects, each section having spacing members separating the recesses thereof, the spacing members of each section forming adjustable scale parts for the scale parts formed by the recesses of the other section, substantially as specified.

7. An apparatus of the character described comprising a pair of interengaging sections, one of said sections having a recess therein to designate an object, and the other of said sections having a projecting member thereon adapted to work within said recess in said first-named section whereby to vary the dimension, in one direction, of the object represented by said recess as said second-named section is adjusted relative to said first-named section, and means for maintaining said sections in operative relation to one another, substantially as specified.

8. An apparatus of the character described comprising a pair of interengaging sections, one of said sections having a recess therein to designate an object, and the other of said sections having a projecting member thereon adapted to work within said recess in said first-named section whereby to vary the dimension, in one direction, of the object represented by said recess as said second-named section is adjusted relative to said first-named section, and means secured to one of said sections and slidingly engaging the other of said sections to maintain the sections in operative relation to one another, substantially as specified.

9. An apparatus of the character described comprising a pair of interengaging sections, one of said sections having a recess therein to designate an object, and the other of said sections having a projecting member thereon adapted to work within said recess in said first-named section whereby to vary the dimension, in one direction, of the object represented by said recess as said second-named section is adjusted relative to said first-named section, and means secured to each of said sections and slidingly engaging the other of said sections to maintain the sections in operative relation to one another, substantially as specified.

10. An apparatus of the character described comprising a pair of interengaging sections, one of said sections having a recess therein to designate an object, and the other of said sections having a projecting member thereon adapted to work within said recess in said first-named section whereby to vary the dimension, in one direction, of the object represented by said recess as said second-named section is adjusted relative to said first-named section, and a strip secured to the projecting member and having its ends formed to slidingly embrace the edge of the recessed section to maintain the sections in operative relation to one another, substantially as specified.

11. An apparatus of the character described comprising a pair of interengaging sections, each having a series of recesses whose inner ends designate a particular object or series of objects, and spacing members serving to separate said recesses; the spacing members of each of said sections being adapted to work within the recesses of the other of said sections, and by the movement of said sections relative to each other being adapted to vary the sizes of said recesses in one direction to indicate, several different dimensions of the objects represented by said recesses, each of said sections having a member secured thereto and having its ends slidingly engaging the other of said sections to maintain the sections in operative relation to one another, substantially as specified.

12. An apparatus of the character described comprising a pair of interengaging sections, each having a series of recesses whose inner ends designate a particular object or series of objects, and spacing members serving to separate said recesses; the spacing members of each of said sections being adapted to work within the recesses of the other of said sections, and by the movement of said sections relative to each other being adapted to vary the sizes of said recesses in one direction to indicate several different dimensions of the objects represented by said recesses, each of said sections having a member secured thereto and having its ends slidingly engaging the other of said sections to maintain the sections in operative relation to one another, one of said members being secured to the upper side of its associated section and the other of said members being secured to the under side of its associated section, substantially as specified.

Signed at the city of New York, in the county and State of New York, this 8th day of September, one thousand nine hundred and fifteen.

PAUL H. FABRICIUS.

Witnesses:
CONRAD A. DIETERICH,
JOSEPH G. QUINN, Jr.